United States Patent [19]

Suzuki et al.

[11] 4,392,673

[45] Jul. 12, 1983

[54] SEATBELT SYSTEM

[75] Inventors: Ichiro Suzuki, Nagoya; Jun Yasumatsu, Toyota; Yoshikazu Imai, Toyota; Masanao Motonami, Toyota, all of Japan

[73] Assignee: Toyota Jidosha Kogyo Kabushiki Kaisha, Aichi, Japan

[21] Appl. No.: 193,831

[22] Filed: Oct. 3, 1980

[30] Foreign Application Priority Data

Oct. 5, 1979 [JP] Japan ............................ 54-138763[U]

[51] Int. Cl.³ .............................................. B60R 21/02
[52] U.S. Cl. ..................................... 280/804; 297/483
[58] Field of Search ...................... 280/802, 803, 804; 297/468, 474, 475, 483, 486

[56] References Cited

U.S. PATENT DOCUMENTS

| 3,842,929 | 10/1974 | Wada et al. | 180/82 C |
| 3,882,955 | 5/1975 | Kaneko et al. | 180/82 C |
| 3,968,978 | 7/1976 | Hayashi | 280/745 |
| 4,219,897 | 9/1981 | Minami | 280/802 |
| 4,266,810 | 5/1981 | Thomas et al. | 280/802 |

Primary Examiner—Richard A. Bertsch
Attorney, Agent, or Firm—Parkhurst & Oliff

[57] ABSTRACT

A raised arm structure protruding inwardly on a vehicle door has a longitudinally extending slit through the undersurface thereof, and through the slit, a movable belt guide within the arm structure slidably holds an intermediate portion of an occupant restraining webbing from within the arm structure, whereby a part of the webbing held by the movable belt guide is out of sight from above and under the arm structure.

10 Claims, 4 Drawing Figures

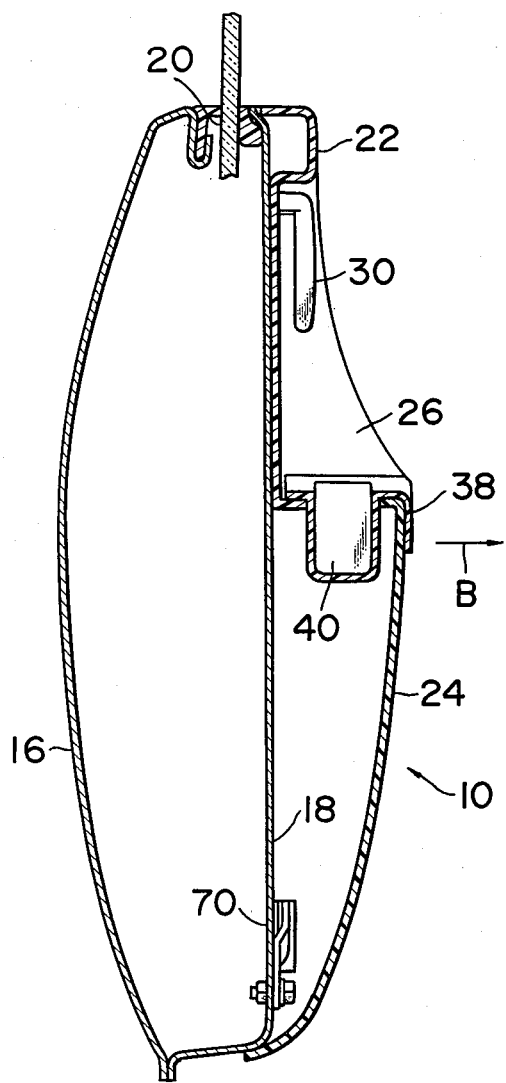
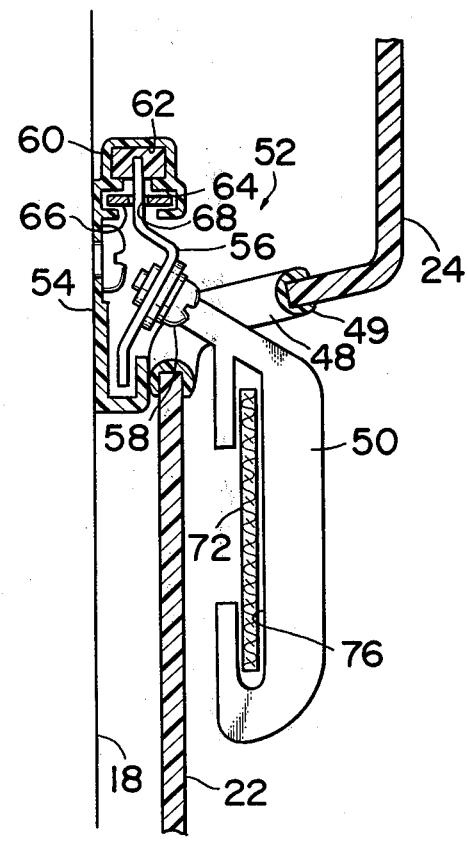

SEATBELT SYSTEM

BACKGROUND OF THE INVENTION

1. Field of the Invention

The present invention relates to a seatbelt system for protecting an occupant in a vehicular emergency, and more particularly to a seatbelt system capable of automatically placing a restraining webbing over the occupant.

2. Description of the Prior Art

Heretofore, there has been proposed a seatbelt system wherein when the occupant enters or leaves the vehicle, a belt guide is moved along a door of the vehicle, whereby an occupant restraining webbing is moved in the longitudinal direction of the vehicle, so that the webbing can be automatically placed over the occupant. With the arrangement as described above, upon closing of the door by the occupant after his entering the vehicle, the webbing is automatically placed over the occupant, thereby improving the safety of the occupant. Further, when the occupant leaves the vehicle, upon opening of the door by the occupant, the webbing automatically moves away from the occupant, so that the occupant can leave the vehicle.

However, with the seatbelt system as described above, in case the belt guide causes the webbing to move forward in the vehicle, the webbing which is movable relative to and along the door comes in sight of the occupant entering or leaving the vehicle. As a result, the occupant feels uncomfortable seeing the webbing on the door and could be discouraged to enter or leave the vehicle. Additionally, in order to connect the belt guide to a driving means provided in the door, it is necessary to form a slit in the door in the longitudinal direction thereof. In the same manner as in the case of the aforesaid movable webbing, the slit gives a feeling of incompatibility to the occupant, and allows foreign materials to enter the door therethrough.

SUMMARY OF THE INVENTION

The present invention has been developed to obviate the above-described disadvantages and has as its object the provision of a seatbelt system, in which the slit formed in the door and the webbing which is movable when the door is opened do not come in sight of the occupant entering or leaving the vehicle. The movable webbing enters the door and extends at an angle around a belt guide.

The seatbelt system according to the present invention is of such an arrangement that a slit is formed at the lower portion of a raised portion on a raised arm structure provided on the door, the belt guide is moved through the slit, so that the slit and the movable webbing can be shielded from the sight of the occupant when he enters or leaves the vehicle.

Description will hereunder be given of an embodiment of the present invention.

BRIEF DESCRIPTION OF THE DRAWINGS

FIG. 3 is a sectional view taken along the line III—III in FIG. 2; and

FIG. 4 is a sectional view taken along the line IV—IV in FIG. 2.

DESCRIPTION OF THE PREFERRED EMBODIMENT

Figure 1:
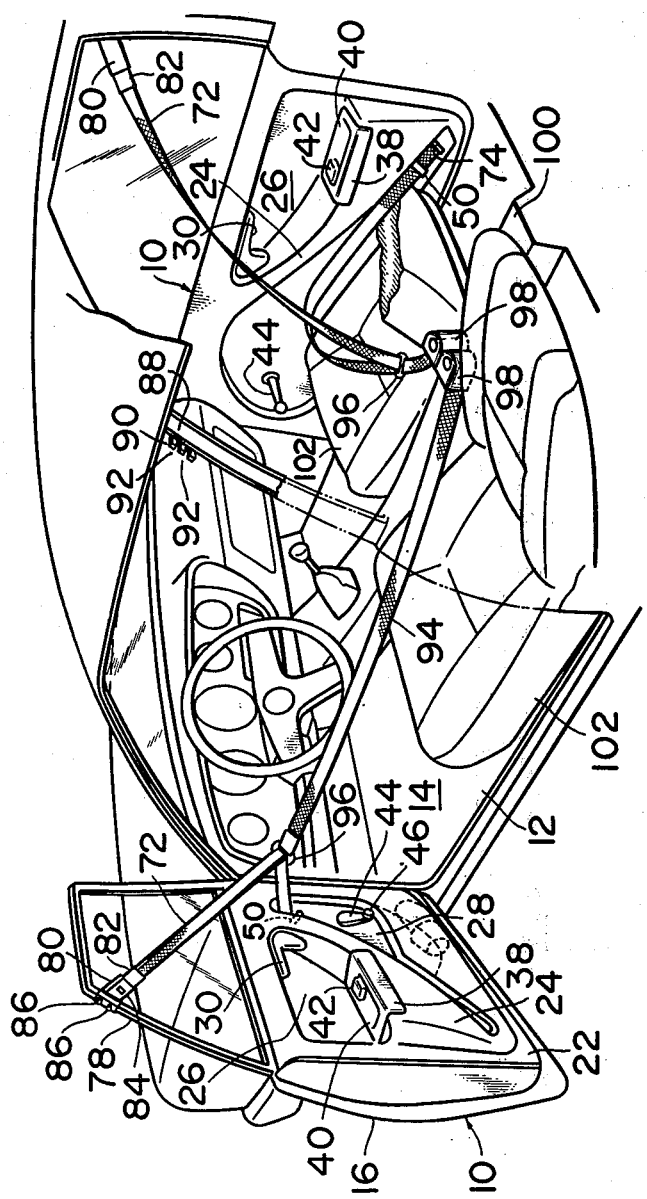
FIG. 1 is a perspective view showing an embodiment of construction of the vehicle door in an opened condition according to the present invention.

In FIG. 1, a door 10 is pivotally supported on a vehicle body 12 of a motor vehicle and rotatable in the horizontal direction to allow an occupant to enter or leave a compartment 14.

As shown in FIG. 3, an outer panel 16 and an inner panel 18, both of which are made of thin steel sheets, are connected to each other to provide a box-shaped door 10, which incorporates therein a regulator, not shown, for vertically moving a window pane 20.

Secured to the inner panel 18 is a door trim 22 made of a synthetic resin material. The door trim 22 is fastened to a suitable position of the inner panel 18 through mounting screws, not shown.

An inwardly open recess is formed at the center of the door trim 22. The recess is divided into two sections including an upper receiving recessed portion 26 and a lower receiving recessed portion 28 by a raised portion or a raised arm structure 24 protruding into the compartment and running from the lower rear portion to the upper forward portion of the door.

Figure 2:
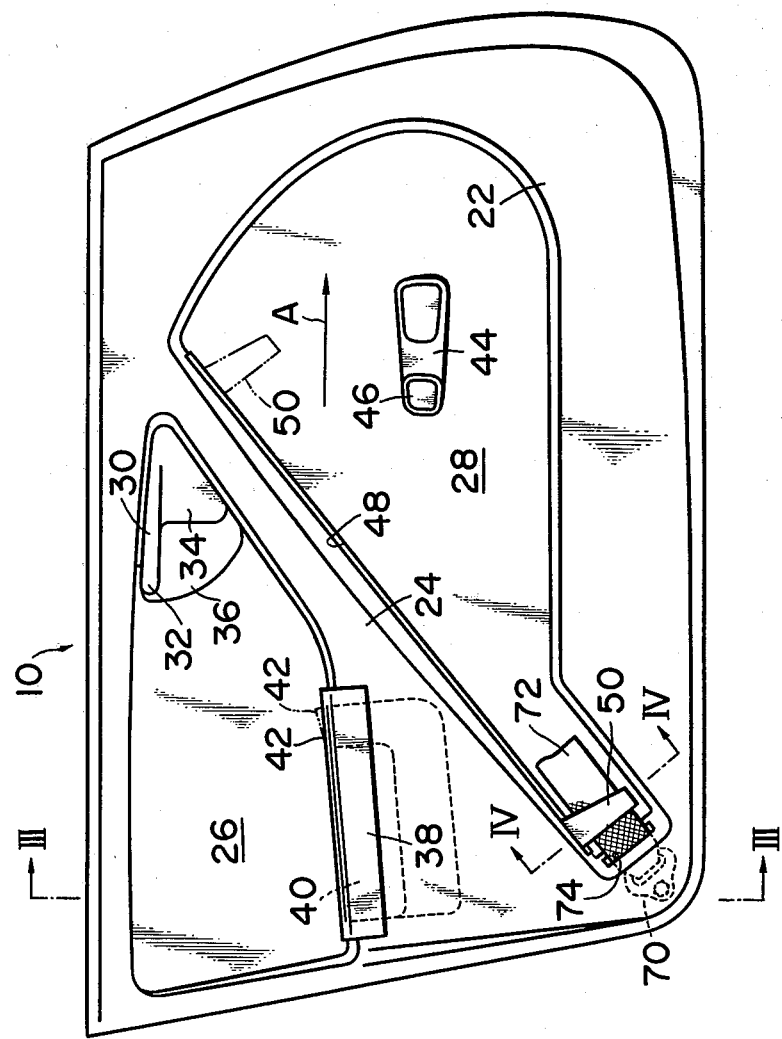
FIG. 2 is a front view showing the door in a closed condition.

The upper receiving recessed portion 26 is tapered off in the vertical dimension toward the front of the vehicle (in a direction indicated by arrow A in FIG. 2). An inside rotatable handle 30 is pivotally supported at the forward end portion of the upper receiving recessed portion 26 through a horizontal pivot 32. If the occupant pulls a grip portion 34 of the inside handle 30 around the pivot 32, then a latch, not shown, can be released to thereby open the door. Since the inside handle 30 is received in the upper receiving recessed portion 26, there is no possibility that the occupant could accidentally contact the handle. In addition, a space 36 is formed between the grip portion 34 and the bottom surface of the upper receiving recessed portion 26 by partially outwardly deforming the bottom surface. The space is used for receiving fingers of the occupant. The provision of the inside handle 30 in the upper receiving recessed portion 26 of the door trim 22 as described above eliminates the necessity of an inside handle bezel as in the prior art.

As shown in FIG. 2, the raised portion 24 progressively increases in vertical height toward the lower rear portion of the vehicle and an arm rest cover 38 is secured onto the upper surface thereof facing the upper receiving recessed portion 26. As shown in FIG. 3, the arm rest cover 38 made of a synthetic resin material is formed into a bent shape, with the center thereof including an upwardly open recess defining a pocket 40 for receiving small things. Consequently, the arm rest cover 38 together with the raised portion 24 constitutes an arm rest for the occupant. As shown in FIG. 3, a portion of the raised portion 24 close to the position where the arm rest cover 38 is secured, is raised farther into the compartment (in a direction indicated by an arrow B) than the upper and lower end portions of the door trim 22, so that the occupant can conveniently use it as an arm rest.

In addition, a door lock button 42 is received in a portion of the arm rest cover 38, which is disposed forwardly in the vehicle. As indicated by two-dot chain lines in FIG. 2, the lock button 42 projects farther upwardly than the upper end of the arm rest cover 38 in a condition of unlocking the vehicle door from the vehicle body, and, when the occupant presses the lock button 42 to lock the door, the lock button 42 becomes flush with the upper end face of the arm rest cover 38 so as to not protrude from the upper end face.

As shown in FIG. 2, a window pane regulator handle 44 is secured to the center of the lower receiving recessed portion 28, and when a grip portion 46 of said handle is rotated, the window pane regulator in the door is actuated so that the window pane 20 can be vertically moved. Since the regulator handle 44 is also received in the lower receiving recessed portion 28, the regulator handle 44 does not protrude from the door trim 22 into the compartment, so that the regulator does not accidentally interfere with the occupant.

Furthermore, a slit 48 is formed at the undersurface of the raised portion 24 facing the lower receiving recessed portion 28 as shown in FIG. 4. The slit 48 is formed along the raised portion 24 from the lower rear portion to the upper forward portion of the door, and the brim of the opening of the slit 48 is covered with a braid 49. A belt guide 50 extends through said slit 48 and is driven by belt guide driving means 52 provided between the door trim 22 and the inner panel 18 to move from the lower rear portion of the door indicated by solid lines to the upper forward portion indicated by two-dot chain lines in FIG. 2. In the belt guide driving means 52, a guide rail 54 is disposed along the longitudinal direction of the raised portion 24, has a substantially U-shaped transverse cross-section and receives therein a slide piece 56. Solidly secured through a screw 58 to the slide piece 56 is the belt guide 50, and a shoe 60 fixed on one end of the slide piece 56 is disposed in a first sliding groove 62 of the guide rail 54 and movable in the longitudinal direction of the guide rail 54. Furthermore, a slide tape 66 is received in a second sliding groove 64 formed adjacent to the first sliding groove 62, connected to the slide piece 56, and subjected to a driving force of an electric motor, not shown, to move in the longitudinal direction of the guide rail 54. As a result, the slide piece 56 together with the shoe 60 can be moved in the longitudinal direction of the guide rail 54.

The slide tape 66 is made of a flexible synthetic resin material connected to the slide piece 56 by receiving the slide piece 56 through a receiving opening 68 formed at one end in the longitudinal direction thereof, and the other end of the slide tape 66, not shown, is adapted to receive a driving force from the driving motor. This driving force from the driving motor can be transmitted to the slide tape 66 in such a manner that a sprocket wheel driven by the driving motor is meshed with a multiplicity of openings formed in the slide tape 66 in the longitudinal direction thereof.

In addition, the belt guide driving means 52 detects the seated condition of the occupant entering the vehicle to be moved to the lower rear portion of the door as shown in FIG. 2, and detects the condition of the occupant leaving the vehicle to be moved to the upper forward portion of the door as indicated by two-dot chain lines in FIG. 2. For example, when the occupant opens the door to enter the vehicle, then an opened door detecting signal from a limit switch or the like, not shown, applies a voltage to the driving motor to drive the slide tape 66, whereby the slide piece 56 is moved to the upper forward portion of the door as indicated by two-dot chain lines in FIG. 2. When the occupant closes the door upon entering the vehicle, then the motor is reversed, whereby the slide piece 56 is moved to the lower rear portion of the door as indicated by solid lines in FIG. 2.

An anchor plate 70 is fixed between the door trim 22 and the inner panel 18 of the door more rearwardly in the vehicle than the lower receiving recessed portion 28, whereby one end portion of an outer webbing 72 is secured to the door. The outer webbing 72 is exposed into the compartment through an opening 74 formed at the end of the lower receiving recessed portion 28 rearwardly in the vehicle, and after passing a C-shaped engageable portion 76 of the belt guide 50, the outer webbing 72 is connected with the upper end of the door by means of a buckle device 80 secured to a door frame 78 of the door 10. The outer webbing 72 is secured to the buckle device 80 in a manner that a tongue plate 82 secured to one end portion of the outer webbing 72 is engaged with the buckle device 80. Furthermore, when the occupant presses a release knob 84, then the buckle device 80 is disengaged from the tongue plate 82, so that the occupant can escape from the vehicle in an emergency.

Further, in the buckle device, a shoulder side anchor 86 protrudes rearwardly. The shoulder side anchor 86 is engageable with a cutout 92 of an engageable plate 90 which protrudes outwardly from the vehicle at the upper portion of a center pillar 88 of the vehicle body when the door is closed, whereby an enlarged head of the shoulder side anchor 86 is engaged with the cutout 92 of the engageable plate 90, so that the high tension acting on the outer webbing 72 can be imparted to the center pillar 88 in an emergency.

An intermediate portion of the outer webbing 72 is inserted through a ring joint 96 secured to the forward end of an inner webbing 94, and the outer webbing 72 and inner webbing 94 bring the occupant into a three-point seatbelt fastened condition.

The other end of the inner webbing 94 is wound up by a retractor 98, which is secured to a tunnel portion 100 provided substantially at the center of the vehicle. The retractor 98 is adapted to wind up the inner webbing 94 by the biasing force thereof, and incorporates therein an inertia lock mechanism for suddenly stopping the windoff of the inner webbing 94 in an emergency.

Description will hereunder be given of the operation of an embodiment of the present invention. When the occupant opens the door to enter the vehicle, the belt guide 50 is moved forward in the vehicle by the belt guide driving means 52, whereby, in the outer webbing 72 between the ring joint 96 and the anchor plate 70 in the door, the portion of webbing 72 extending partially around the belt guide 50 is moved forward in the vehicle to a considerable extent as shown in FIG. 1, so that the inner webbing 94 can be also moved forward in the vehicle to a considerable extent to thereby form a space for the occupant to enter the vehicle between an occupant's seat 102 and the inner webbing 94. In this case, the portion of the outer webbing 72 between the belt guide 50 and the anchor plate 70 is covered by the raised portion 24 of the door and out of sight of the occupant, whereby no uncomfortable feeling is given to the occupant because the webbing is out of sight within the door instead of being visible on the door.

When the occupant closes the door upon entering the vehicle, the belt guide driving means 52 again moves the belt guide 50 rearward in the vehicle as shown in FIG. 2, whereby the portion of the outer webbing 72 which extends partially around the belt guide 50 is moved rearward in the vehicle, and the inner webbing 94 is wound up, so that the ring joint 96 can approach the retractor 98. As a result, the occupant can be brought into the three-point seatbelt fastened condition by means of the webbings 72 and 94.

The inner webbing 94 can be unwound from the retractor 98 during a normal running of the vehicle, so that the occupant can change his driving posture. However, in an emergency, the inner webbing 94 is prevented from being unwound from the retractor 98, so that the occupant can be reliably restrained by means of the webbings 72 and 94, thus securing the occupant safely.

Even in a dangerous situation as described above, the control grip and the like of the door 10 do not protrude into the compartment, so that the occupant never contacts the control grip and the like, thus improving the safety for the occupant.

If the occupant needs to escape from the vehicle to the outside, upon pressing the release knob 84 of the buckle device 80 to cause the outer webbing 74 to fall off from the buckle device 80, the occupant can be released from the webbings and the door 10 can be opened, thus enabling him to leave the vehicle.

In addition, when the occupant leaves the vehicle upon the completion of normal running of the vehicle, if he opens the door 10, the belt guide 50 is moved in the direction opposite to that at the time of entering the vehicle, and the condition shown in FIG. 1 is restored, so that he can easily and comfortably leave the vehicle.

As has been described hereinabove, the seatbelt system according to the present invention can offer such an outstanding advantage that, during opening the door, the belt webbing which extends partially around the belt guide and the slit for receiving therein the belt guide can be shielded from sight of the occupant under the raised portion, so that the occupant can very comfortably enter or leave the vehicle, i.e., he does not see the webbing within the door.

What is claimed is:

1. A seatbelt system for an automotive vehicle having a door and an occupant restraining webbing, said seatbelt system comprising:
   a raised door arm structure on the inside of the door, said arm structure protruding inwardly and extending approximately from one end of the door to the other end thereof;
   a longitudinally extending slit defined through the undersurface of said arm structure; and
   belt guide means in said arm structure, said belt guide means being movable longitudinally within said arm structure and guiding said webbing through said slit from within said arm structure, whereby at least a part of said webbing guided by said belt guide means is out of sight from above and under said arm structure.

2. A seatbelt system as set forth in claim 1, wherein said arm structure progressively increases in vertical height toward the rear of the vehicle.

3. A seatbelt system as set forth in claim 2, further comprising an arm rest cover made of synthetic resin material on the upper surface of said arm structure, whereby said arm structure is used as an arm rest for the occupant.

4. A seatbelt system as set forth in claim 1, further comprising means defining an inwardly opening recess on the inside of the door.

5. A seatbelt system as set forth in claim 4, wherein said raised arm structure divides said recess into upper and lower recesses.

6. A seatbelt system as set forth in claim 1, wherein said belt guide means has a C-shaped engageable portion extending through said slit to slidably hold an intermediate portion of said webbing therearound.

7. A seatbelt system as set forth in claim 6, wherein said webbing includes first and second webbing components, and one end of said first webbing component is secured to the lower portion of the door.

8. A seatbelt system as set forth in claim 7, wherein the other end of said first webbing component is secured to the upper portion of the door.

9. A seatbelt system as set forth in claim 8, wherein one end of said second webbing component is connected with an intermediate portion of said first webbing component and the other end of said second webbing component is wound upon a retractor.

10. A seatbelt system for an automotive vehicle having a door, said seatbelt system comprising:
   at least one occupant restraining webbing, one end of said webbing being secured to the lower rear portion of the door;
   means defining an inwardly opening recess on the inside of the door;
   a raised door arm structure on the inside of the door, said arm structure protruding inwardly and extending approximately from one end of the door to the other end thereof so that said recess is divided into two sections including an upper recess and a lower recess;
   a longitudinally extending slit defined through the undersurface of said arm structure; and
   belt guide means in said arm structure, said belt guide means being movable forward within said arm structure when the door is open and rearward when the door is closed and slidably guiding an intermediate portion of said webbing through said slit from within said arm structure, whereby a part of said webbing extending from the end thereof to said intermediate portion guided by said belt guide means is out of sight from above and under said arm structure.

* * * * *